Jan. 6, 1970  F. EKMAN  3,488,039
FILTER BED FOR DUST COLLECTOR
Filed May 20, 1968  3 Sheets-Sheet 2
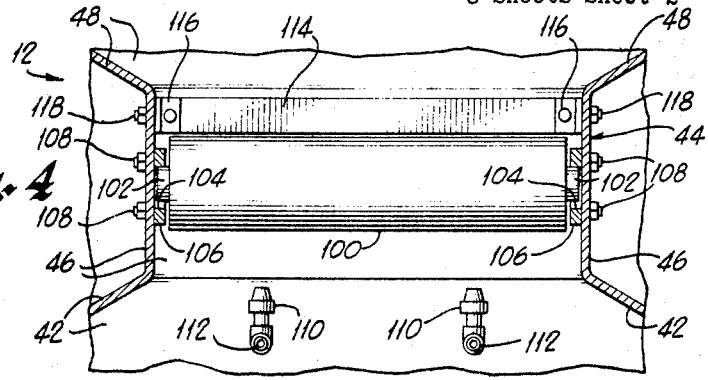
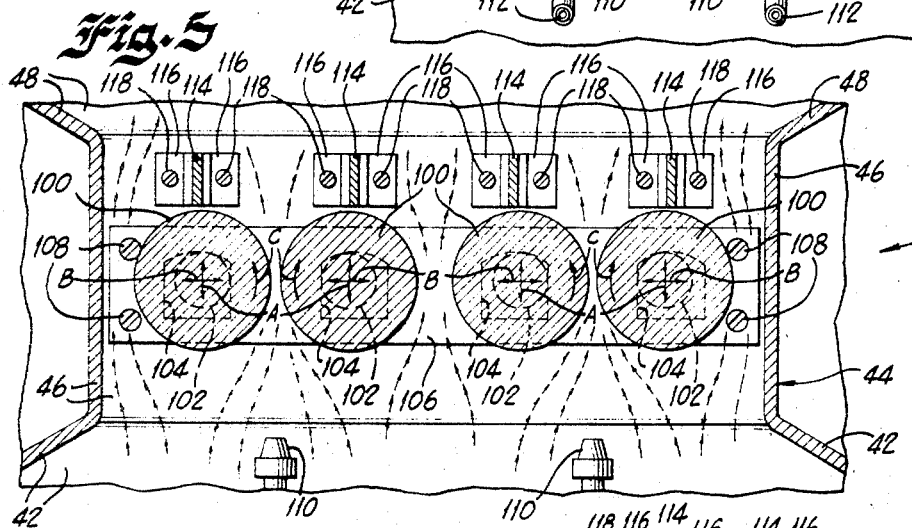
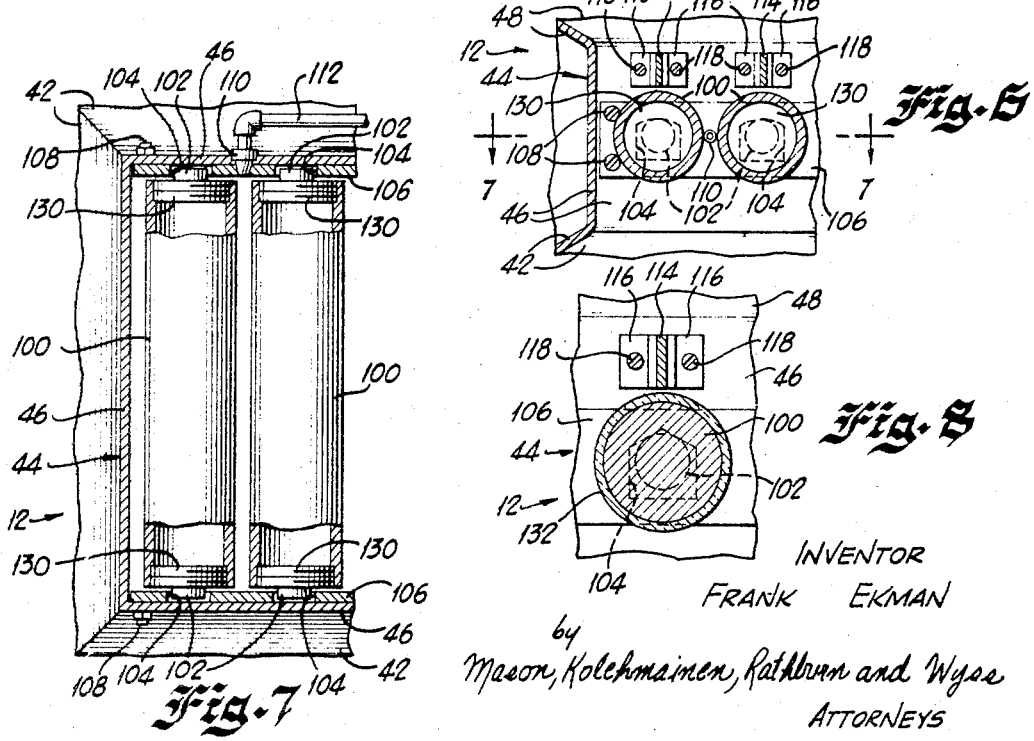
INVENTOR
FRANK EKMAN
by
Mason, Kolehmainen, Rathburn and Wyss
ATTORNEYS

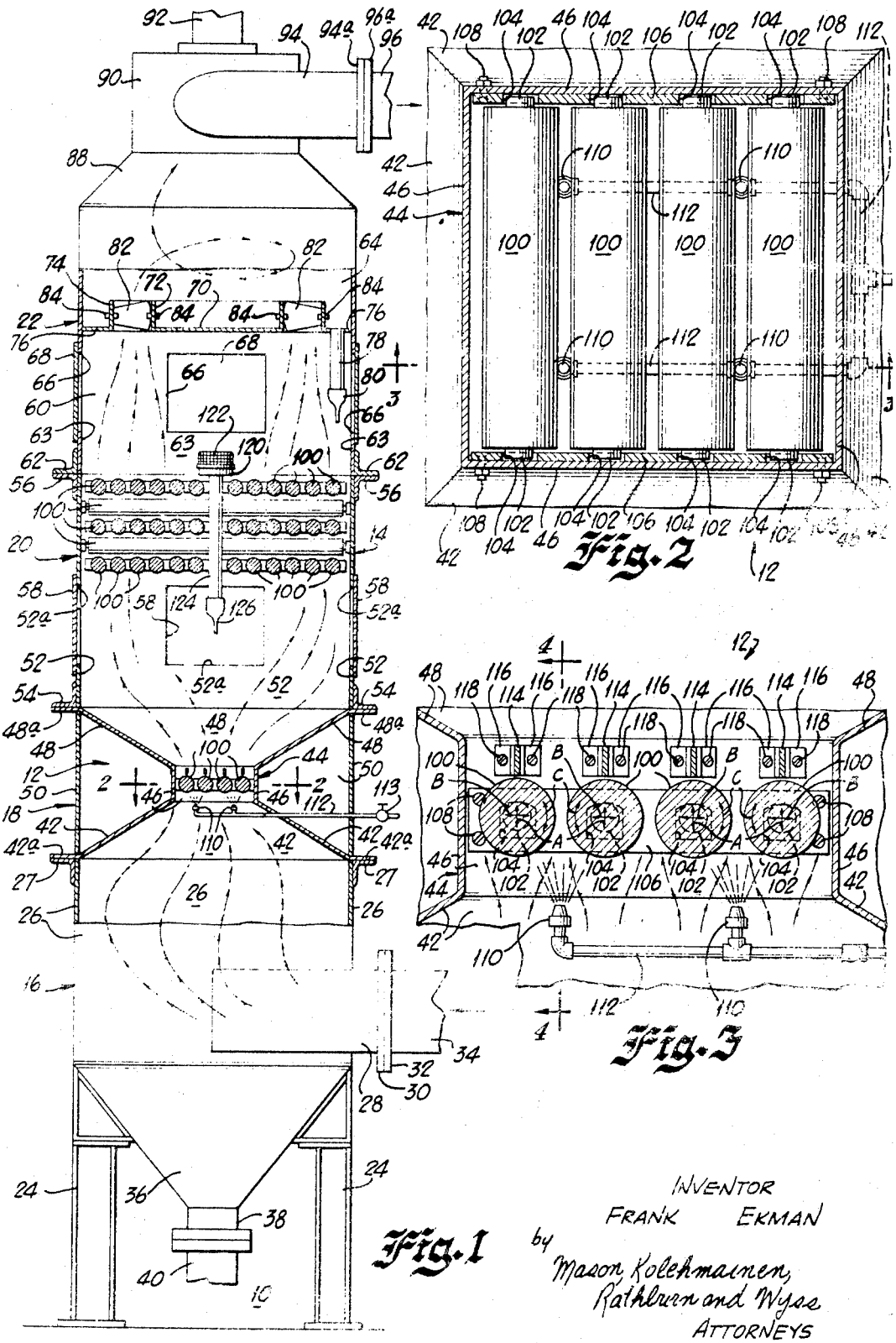

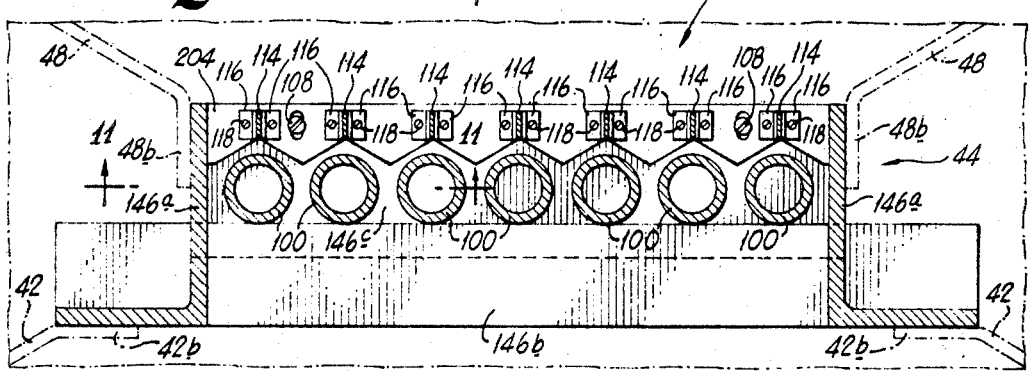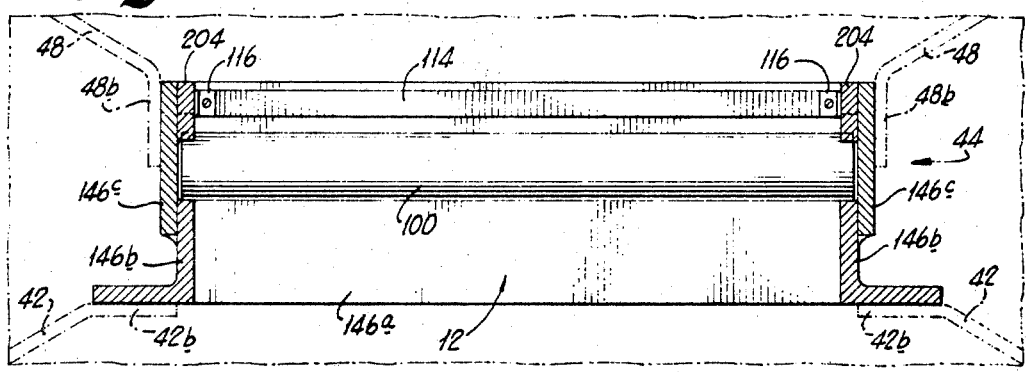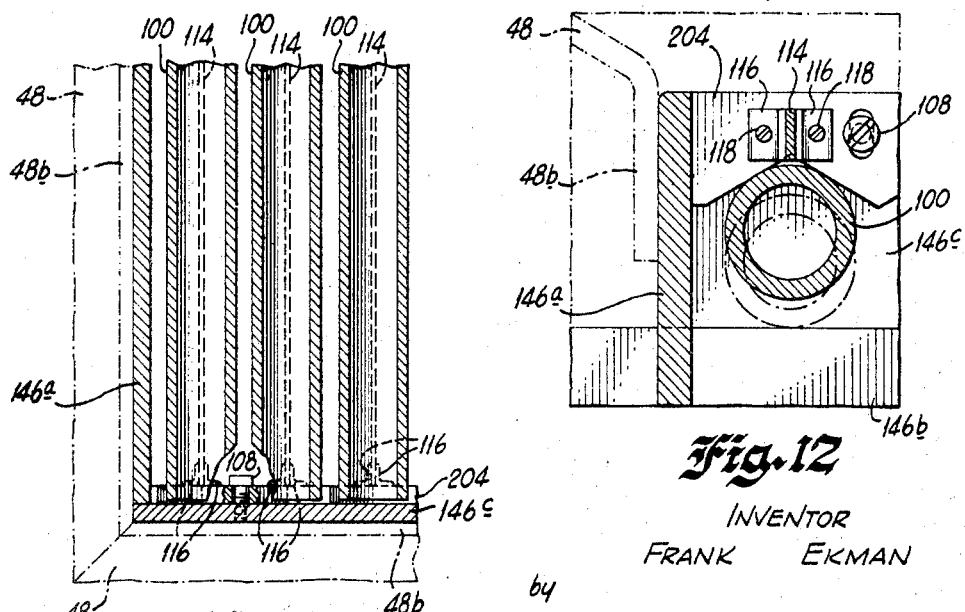

United States Patent Office 3,488,039
Patented Jan. 6, 1970

3,488,039
FILTER BED FOR DUST COLLECTOR
Frank Ekman, Barrington, Ill., assignor to National Dust Collector Corporation, Skokie, Ill., a corporation of Illinois
Filed May 20, 1968, Ser. No. 730,517
Int. Cl. B01d 50/00, 46/02, 47/00
U.S. Cl. 261—81
16 Claims

ABSTRACT OF THE DISCLOSURE

A filter bed for use in a dust collector for separating contaminants from gases comprising a plurality of elongated filter elements disposed in spaced apart, side-by-side relation transversely across the flow path of the gases in said collector. Each filter element includes a substantial exterior surface area for direct contact with the gas flowing between and around the filter elements in the bed, and means is provided for loosely supporting each element in said flow path to permit limited movement toward and away from adjacent elements as well as rotation about its longitudinal axis and limited movement with and against the general direction of gas flow through the bed, and liquid spray means may be provided.

---

The present invention relates to a new and improved filter bed for use in a dust collector adapted for collecting contaminants from gas, and, more particularly, the filter bed of the present invention is adapted for use in a wet-type gas scrubber wherein a liquid collecting medium is introduced into a high velocity gas flow adjacent the filter elements in the filter bed for contacting and collecting the contaminant particles in the gas.

The present invention is an improvement on the filter beds illustrated and described in United States Patent No. 3,348,825, dated Oct. 24, 1967. Many prior filter devices used in wet-type gas scrubbers utilize spherical filter elemnts of glass or metal for providing a plurality of diverse and tortuous paths for the gas flowing through the filter bed. These spherical filter elements provide a large surface area on which liquid particles impinge and contact the gas for collecting impurities and contaminant particles therein. One of the problems associated with the glass filter elements is that many commercially available glass spheres are not made with close enough dimensional tolerances, so that the spheres may be arranged in a filter bed in a loosely packed manner permitting the elements to move slightly and roll freely, yet packed closely enough so that the elements do not remain permanently displaced. Although glass has many excellent characteristics for use as filter element material, it tends to fracture rather easily when subjected to rapidly changing temperatures along with mechanical impact. Metal spheres available in the desired dimensional tolerances are extremely expensive and are hard to obtain in the quantities required.

It is therefore an object of the present invention to provide a new and improved filter bed for a dust collector.

It is also an object of the present invention to provide a new and improved filter bed for a dust collector wherein spherical glass marbles or metal spheres are not required, yet comparable, excellent filtering characteristics are achieved therein.

Another object of the present invention is to provide a new and improved filter bed having means therein defining a plurality of diverse, tortuous paths for accelerating and decelerating the gas flow between the filter elements so that contaminant particles in the gas will precipitate out of the flow and collect in the liquid on the surfaces of the filter elements.

Still another object of the present invention is the provision of a new and improved filter bed of the character described wherein the filter elements comprise elongated members having substantially large surface areas, against which the gas flow is in direct impingement whereby contaminants from the gas are collected on the surface areas of the elements.

Yet another object of the present invention is the provision of a new and improved filter bed of the character described wherein the elongated filter elements are movable in limited fashions by variations in gas flow through the filter bed, with the spacing between adjacent filter elements being changeable.

Another object of the present invention is the provision of a new and improved filter bed of the character described employing elongated filter elements which are supported in a manner that they may rotate about their longitudinal axes and, in addition, may move toward and away from adjacent elements to increase and decrease the spacing for gas flow therebetween.

Yet another object of the present invention is the provision of a new and improved filter bed of the character described wherein the filter elements are provided with replaceable sleeves which can be readily removed and replaced after excessive wear.

Yet another object of the present invention is the provision of a new and improved filter bed of the character described wherein the filter elements are movable with and against the direction of gas flow.

Still another object of the present invention is the provision of a new and improved filter bed of the character described in which the filter elements may roll about their longitudinal axes so that contaminant material building upon the surfaces of the elements is engaged by scrapers or the like and thereby dislodged.

Yet another object of the invention is to provide a filter bed wherein particles collected on the surfaces of the filter element are continuously removed in a mechanical scraping action.

Still another object of the invention is to provide a filter bed having filter elements that are continuously moved toward and away from one another by variations or disturbances in the velocity of the gas flow through the filter bed.

Another object of the present invention is the provision of a new and improved filter bed of the character described wherein filter elements having close dimensional tolerances are not required and yet the filter bed is extremely efficient in operation.

Yet another object of the present invention is the provision of a new and improved filter bed including means for introducing a liquid medium for collecting contaminants in the region of highest velocity of the gas flow to thereby insure maximum mixing efficiency between the droplets of liquid medium and the gas and resulting in higher collection efficiency.

The foregoing and other objects of the present invention are accomplished in one embodiment by the provision of a dust collector employing a new and improved filter bed comprising a plurality of elongated filter elements disposed in spaced apart, side-by-side relation, transversely across the flow path of the gases flowing through the filter bed. Each filter element includes a substantially large exterior surface area for direct contact with the gases flowing around and between adjacent elements in the bed, and each element is supported in the flow path of the gas in a manner permitting limited movement of the element toward and away from its adjacent laterally spaced elements and toward and against the general direction of gas flow through the filter bed. Each element is also rotatable about its respective longitudinal axis so that contaminant particles collecting on the surface are continuously being dislodged and removed by the rolling and vibrating action. In addition, fixed scraper means may be provided in close proximity to the exterior surface of each element so that as the elements move and roll, buildups of contaminants on the surface are physically scraped and dislodged therefrom by the relative movement between the filter elements and scraper means.

For a better understanding of the present invention reference should be had to the following detailed description taken in conjunction with the drawings, in which:

FIG. 1 is a vertical sectional view illustrating an updraft, wet scrubber-type dust collector employing a new and improved filter bed constructed in accordance with the present invention;

FIG. 2 is a transverse, horizontal cross-sectional view taken through the filter bed substantially along line 2—2 of FIG. 1;

FIG. 3 is an enlarged, vertical, sectional view through the filter bed taken substantially along line 3—3 of FIG. 2;

FIG. 4 is an enlarged, vertical, sectional view of the filter bed taken substantially along the line 4—4 of FIG. 3;

FIG. 5 is a vertical sectional view similar to FIG. 3 but enlarged somewhat and showing the filter elements as they are displaced during operation by the action of the gas flow through the filter bed;

FIG. 6 is a fragmentary, vertical, sectional view of another embodiment of a filter bed constructed in accordance with the invention, including means for introducing liquid collecting medium into the filter bed in the region of highest gas velocity;

FIG. 7 is a horizontal cross-sectional view of the filter bed of FIG. 6 taken substantially along line 7—7 thereof;

FIG. 8 is an enlarged, fragmentary, vertical, sectional view of yet another embodiment of a filter bed constructed in accordance with the present invention;

FIG. 9 is an enlarged, vertical, sectional view of still another embodiment of a filter bed in accordance with the features of the present invention;

FIG. 10 is a sectional view taken substantially along lines 10—10 of FIG. 9;

FIG. 11 is a fragmentary, horizontal, sectional view taken substantially along lines 11—11 of FIG. 9; and FIG. 12 is an enlarged, fragmentary, sectional view showing a small portion of the left-hand side of the filter bed as viewed in FIG. 9 and illustrating a filter element in an upwardly displaced position.

Referring now, more specifically, to the drawings, therein is illustrated in FIGS. 1 through 5 one embodiment of an updraft, wet scrubber-type dust collector 10 adapted to remove contaminants from gas and employing a pair of new and improved filter beds 12 and 14, both being constructed in accordance with features of the present invention. The dust collector 10 includes a large, upstanding housing which comprises a plurality of separable, vertically stacked sections 16, 18, 20, and 22, the lowest or inlet sump section 16 being adapted to be supported from the floor or other surface by a plurality of legs 24. The lower section includes rectangular, vertical sidewalls, or panels 26, and a peripheral flange 27 of angle iron is mounted adjacent the upper edges of the side panels for supporting the next adjacent housing section 18.

Contaminated gas to be cleaned is introduced into the inlet housing section 16 through an inlet fitting 28 in communication with the interior thereof through an enlarged opening formed in one of the sidewalls 26, and the inlet fitting is provided with a peripheral flange 30 around its outer end adapted for connection with a flange 32 on the end of a supply duct 34 for supplying the contaminated gas which is to be cleaned.

The contaminated gas entering the housing section 16 expands and flows upwardly into the next, upper adjacent housing section 18, and during this period many of the heavier contaminant particles contained in the gas tend to gravitate out of the flow and fall downwardly toward the lower portion or sump formed at the bottom of the housing section 16, which comprises a plurality of inwardly and downwardly sloping walls 36 joined to a flanged outlet or drain fitting 38 at their lower ends. The upper edges of the sloping walls 36 are joined with the lower edges of the vertical sidewalls 26 and, preferably, the walls 26 and 36 are joined together by welding to form a gas-tight enclosure. A drain line 40 is connected to the lower end of the outlet fitting 38 in order to carry away the contaminants collected from the gas along with excess liquid medium which is introduced in the wet scrubbing process taking place in the dust collector.

The housing section 18 is immediately above and is bolted to the upper end flange 27 of the inlet housing section 16. Housing section 18 includes a plurality of lower sidewalls 42 sloping upwardly and inwardly, a plurality of intermediate, relatively short, vertical sidewalls 46 forming a throat or nozzle enclosure 44 having a transverse cross-sectional area substantially less than that of the base or lower housing section 16. A plurality of sidewalls 48 slope upwardly and outwardly from the upper end of the throat or nozzle enclosure 44 and, as indicated in FIGS. 1, 3, 4, and 5, each group of vertically adjacent sidewalls 42, 46, and 48 are preferably formed from a single sheet of steel which is bent to shape as shown and then welded along the corners to the laterally adjacent walls. Along the lower edges of the lower sidewalls 42 is formed a horizontally outwardly extending flange portion 42a, which rests on the flange 27 at the upper end of the inlet housing section 16, and the flanges 27 and 42a are secured together by a plurality of bolts not shown, extending through the flanges and spaced at appropriate intervals around the periphery of the housing sections. The upwardly and outwardly sloping sidewalls 48 are formed with horizontally outwardly extending flange portions 48a for supporting the next adjacent stacked housing section 20 which holds the larger filter bed 14. If desired, or required, for strengthening, the housing section 18 is provided with vertically extending, rectangular outer sidewalls 50 which encase the intermediate throat section 44 and are joined at their upper and lower edges to the respective upper and lower flange portions 42a and 48a.

As indicated by the flow arrows in FIG. 1, the contaminated gases moving upwardly from the lower housing section 16 into the next adjacent housing section 18 are directed inwardly toward the center of the housing by the upwardly and inwardly sloping sidewalls 42 into the intermediate throat section 44 which has a substantially reduced cross-sectional area. After passing through the throat section 44, the gases then expand, as permitted by the outwardly sloping sidewalls 48, and flow into the housing section 20. Accordingly, the gas velocity is at a minimum value adjacent the upper and lower ends of the housing section 18 and reaches a maximum value as it passes through the throat section 44, wherein the cross-sectional flow area is a minimum.

The next adjacent housing section 20, which holds the filter bed 14, includes a plurality of vertically upstanding, rectangular sidewalls 52, and a peripheral flange 54 of angle iron is provided adjacent the lower end of the housing section for supporting and connecting the section to the flange portion 48a on the housing section 18. An upper peripheral angle iron flange 56 is provided at the upper end of the side panels 52 for supporting the upper or top housing section 22.

The filter bed 14, constructed in accordance with the present invention, is mounted adjacent the upper end portion of the housing section 20, and one or more of the sidewalls 52 are provided with an access opening 52a so that the interior of the housing section is readily accessible for service. One or more doors 58 are provided to seal the openings 52a and maintain the housing in gastight condition during operation.

The upper housing section 22 includes a lower portion 60 which is square or rectangular in transverse cross-section at the lower end, and is joined at its upper end to an upper section 64 of circular cross section. A peripheral angle iron flange 62 is provided at the lower end of the housing section 22 for supporting and connecting the section to the flange 56 at the upper end of the next lower housing section 20. The lower portion 60 of the housing section 22 includes a plurality of sidewalls 63 and one or more access openings 66 are provided therein to permit access to the interior of the housing above the filter bed 14. Removable door panels 68 are provided for closing and sealing the openings 66 during normal operation of the dust collector. A horizontal, circular wall or baffle member 70 is disposed in coaxial alignment with the vertical center axis of the housing at the junction between the cylindrical upper portion 64 and the lower portion 60 of the housing section 22, and an upstanding, cylindrical ring or flange 72 is secured to extend around the periphery of the circular baffle. An outer, upstanding, concentric, cylindrical ring or flange 74 is spaced outwardly of the ring 72, thereby forming an annular flow passage for the gases flowing upwardly from the lower portion 60 into the upper portion 64 of the housing section 22. The lower edge of the outer ring 74 is supported by a horizontal outer wall or baffle 76 having its outer peripheral edge joined to the inside surface of the housing sidewalls 63. The upstanding, outer cylindrical ring 74 and the baffle or wall member 76 cooperate with the sidewalls 63 of the housing section 22 to form an outer, liquid collecting trough around the housing, and the liquid collected in the trough is intermittently discharged downwardly onto the filter bed 14 through a drainpipe 78 having a socklike valve 80 of rubber or other resilient material at the lower end, which opens periodically when the head of water in the drainpipe and trough reaches a selected height. The liquid separated from the gas in the upper portion 64 of the housing section 22 collects in the trough and is periodically discharged back into the filter bed 14 to be reused in the process. The gas moving upwardly through the annular space between the inner and outer cylindrical rings 72 and 74 is directed outwardly against the walls of the upper housing portion 64 by a plurality of adjustable vanes 82 having support pins or bolts 84 at opposite ends thereof which project through spaced apart openings formed in the respective inner and outer rings. The vanes 82 are individually adjustable with respect to the horizontal and are sloped to centrifuge the gas outwardly in a swirling action as indicated by the flow arrows in FIG. 1. As this occurs, the heavier liquid particles or droplets are thrown outwardly against the inside wall surface of the upper cylindrical section 64 and collect on the walls to flow downwardly into the trough.

A frustoconical transition section 88 is provided at the upper end of the housing section 22 for directing the upwardly swirling gases inwardly into an exhaust fan 90 mounted on its side with an axial inlet opening centered and in communication with the upper end of the housing. The fan 90 is driven by a motor 92 and includes a discharge fitting or boot 94 having a flange 94a at the outer end adapted to be connected to a suitable flange 96a on a discharge duct 96. The fan 90 moves the gas through the dust collector housing from inlet to outlet and discharges the cleansed gases at high velocity into the duct 96.

In accordance with the present invention, the lower filter bed 12 is mounted within the nozzle or throat enclosure 44 of the housing section 18, and the filter bed includes a plurality of elongated, cylindrical, movable filter elements 100 arranged in a single horizontally disposed layer with the elements in side-by-side relation in said layer. The filter elements extending generally transversely of the gas flow through the throat enclosure 44 and are supported for limited vertical, horizontal, and rotational movement therein, as indicated by the vertical arrows A, the horizontal arrows B, and the curved arrows C, in FIG. 3. Each filter element 100 is supported independently of the others and includes a pair of short, cylindrical axle or boss portions 102 projecting outwardly from its opposite ends in coaxial alignment with the longitudinal axis of the filter element. The axle projections extend into slots or openings 104 which are formed in a pair of horizontal extending support bars 106 removably attached to one pair of opposite sidewalls 46 in the throat enclosure 44 by means of a plurality of bolts 108.

As best shown in FIG. 5, the slots 104 in each bar are laterally or horizontally spaced apart and are slightly wider than the diameter of the axle portions 102 on the filter elements. The slots 104 are slightly greater in vertical dimension than the diameter of the axle bosses 102 and are formed with vertical side faces, a flat bottom face, and a curved or arcuately shaped upper end surface. Because of the loose fit between the axle bosses 102 in their respective supporting slots 104, each filter element 100 is freely and independently movable, and when the elements are forced upwardly against the curved top surface of the slots, engagement between the bosses or axles 102 and the upper surfaces of the slots urge the elements toward a center or neutral vertical position aligned on the central axis of the respective slots.

The gases flow upwardly through the lower filter bed section 12 at a high velocity because of the reduced cross-sectional area in the throat section 44, and the velocity is further increased as the gases move in the reduced flow area defined by the spaces between adjacent pairs of the filter elements 100. Because each filter element 100 is free to move a limited distance both vertically and horizontally and is also free to rotate about its longitudinal axis, the elements are continuously moving or vibrating because of turbulence of the high velocity gas flow against and around the surface of the elements. The high velocity upward flow of the gases through the filter bed exerts an upward resultant force on each element, tending to lift the element upwardly until stopped by engagement of the axle portions 102 against the arcuately curved upper surfaces in the slots 104. Because of the curvature of these surfaces, the elements tend to align themselves automatically on the vertical center axis of the respective slots, and this action ultimately returns each element to a centered position after each lateral or horizontal displacement in either direction has taken place.

The individual filter elements 100 are also freely rotatable about their longitudinal axes, and thus the downwardly facing surface area thereon presented to the upwardly flowing gas is constantly changing, as rotation takes place. Oftentimes a flow disturbance will occur, causing a higher velocity gas flow on one side of a filter element with respect to the diametrically opposite side, and this causes lateral displacement of the elements as well as rotation thereof, as indicated by the arrows B and C in FIGS. 3 and 5. The direction of lateral displacement and direction of rotation of an element is, of course, dependent on which side of the element the velocity of gas flow is higher.

In accordance with the present invention, a liquid collecting medium, such as water or the like, is sprayed on the filter bed 12 by a plurality of spray nozzles 110. The spray nozzles are supplied by a common manifold piping system 112, having a control valve 113 (FIG. 1) to control the rate of flow to the nozzles. The liquid leaving the nozzles intermixed with the gas flow and also sprays against the lower surfaces of the filter elements forming a liquid film thereon which aids in collecting the contaminant particles as the flowing gases impinge directly upon these filter wetted surfaces. The contaminant particles in the gases are entrapped by the liquid droplets and the film, and precipitate or deposit on the filter elements. These deposits being irregularly shaped cause increased turbulence in the gas flow around the filter elements, resulting in better mixing between the gas and liquid and greater dust collection efficiencies. As the amount of contaminants accumulates in larger and larger deposits, some of the material drops off and falls into the lower sump section of the lower housing section 16 to be discharged with excess liquid and other contaminant material via the drain line 40.

In accordance with the present invention, above each filter element 100 is mounted a vertically disposed scraper bar 114 positioned to lie on a vertical plane extending downwardly through the neutral axis or lateral center of each slot 104 in the support bar 106. Each scraper 114 is supported at its opposite ends by a pair of angle brackets 116 which are bolted to the walls 46 of the throat section 44 by a plurality of bolts 118. The lower edges of the scraper bars 114 are adapted to contact or lie closely adjacent to the upper surface portions of the respective filter elements 100 when these elements are lifted upwardly by the gas flow with axle portions 102 engaging the curved upper surfaces of the slots 104. As material accumulates and builds up on the lower surface portion of the filter elements, it presents a greater resistance to flow of the gases between adjacent filter elements, and the filter elements rotate about their longitudinal axes until the buildup or accumulation of material on the filter elements engages the lower edge portion of the fixed scraper bars 114 where it is mechanically dislodged and removed from the surfaces of the filter elements. The materials dislodged by the scrapers 114 are normally the larger accumulations, and these drop downwardly and are collected in the lower portion of the lower housing section 16 for discharge through the drain line 40. Because the filter elements 100 are constantly moving laterally, vertically, and rotationally, the collections or accumulations of dust and other contaminant particles thereon are continuously being removed and dislodged by the fixed scraper blades 114 during operation of the dust collector.

Each filter element 100 has a relatively large, cylindrical, external surface area which is constantly being wetted by the liquid sprayed from the nozzles 110 and, consequently, a surface area of liquid film is continuously provided for contact with the gases flowing upwardly through the filter bed 12. The continuous movement of the filter elements 100 is an important factor in providing for the extremely efficient collection of contaminants in the gas flowing through the filter bed, and this high collection efficiency is obtained throughout a wide range of particle sizes. Moreover, the moving filter elements provide a filter bed that is self-cleaning during operation and does not easily become clogged or blocked.

The slots 104 in the respective support bars 106 are spaced apart and dimensioned so that each pair of adjacent filter elements can move laterally enough to touch or contact one another and close off the gas flow passage therebetween. When this occurs, the gas flow between the touching pair of filter elements 100 is cut off or at a minimum value and the static pressure builds up, causing the elements to separate laterally and open the flow passage between the elements. In this manner the elements are continuously moving or vibrating back and forth laterally, toward and away from each other, and the repeated making and breaking of contact also aids in mechanically dislodging buildups of material on the surfaces of the elements.

The flow passage or spacing between each pair of adjacent filter elements approximates a venturi throat and the gas flow is in accordance with the equation $v^2 = kh$, where $v$ is the gas velocity, $h$ is the pressure or vacuum between the two elements, and $k$ is a constant. Any momentary fluctuation or disturbance in the gas flow through one passage will change the flow in an adjacent passage. For example, an increase in velocity through one passage creates a higher vacuum between the two elements defining the passage and the elements are drawn closer together. This in turn reduces the velocity through the adjacent passages because the spacing is widened. Once a passage closes, the flow therethrough is substantially cut off and the passage begins to open. As this occurs, the elements move away from each other past their central or equilibrium positions; causing adjacent passages to be reduced in width and close, and the process thus is repeated continuously producing a continuous opening and closing action between adjacent pairs of elements making up the filter bed. The high velocity flow through the passages is extremely effective in breaking down the larger liquid droplets into smaller ones, and the dust particles in the gas directly impinge on these smaller droplets in space. The larger liquid droplets are literally torn apart by the high velocity gas flow into a myriad of smaller droplets which approach the dust particles in size, and thus extremely intense mixing action and higher collection efficiencies of the smaller size contaminant particles are obtained.

Because the filter elements are freely movable and the spacing between adjacent elements is continuously changing, close dimensional tolerances on the diameter of the filter elements is not required, and thus many types of commercially available rods, tubes, and pipes are suitable for use as elements in the filter bed 12. Moreover, these readily available rods, tubes, and pipes can be used without machining or finishing operations on the surface. The scraper bars 114 can be easily removed, as can the filter elements themselves, simply by removing the support angles 116 and bearing bars 106 from the sidewalls 46 by loosening the bolts 108 and 118.

It is to be understood that while the lower filter bed section 14 is shown as including only four filter elements, a smaller or larger number may be provided for a given installation, and the diameter of the elements can be adjusted accordingly. Moreover, instead of a single layer of elements, two or more layers may be provided, as in the filter bed 14, with the elements in each layer being disposed transversely of the elements in the immediately adjacent upper and lower layers. For example, the upper filter bed includes five horizontal layers of elements, one above the other, with each layer including a substantial number of the filter elements 100. The filter elements in alternative layers are disposed transversely to each other so that the gas flow divides, reunites, and changes direction many times as the gas moves upwardly through the filter bed from the bottom toward the top. The filter bed 14 does not include any fixed scrapers, as in the lower filter bed 12; however, if desired, fixed scrapers like the elements 114 may be provided. The multilayer arrangement of the elements in the filter bed 14 provides for substantial scraping or mechanical removal of deposits on the filter elements with the elements in one layer acting as scrapers for those in the layers above and below. Moreover, scraping action is achieved between adjacent elements in the same layer. The action of the individual elements 100 in the filter bed 14 is identical with those in the lower filter bed 12, and the individual filter elements 100 are supported in the same maner for limited movement horizontally, vertically, and rotationally.

In order to limit the height of the foam, bubbles, and liquid collecting above the filter bed 14, a weir 120 is centrally positioned adjacent the upper layer of elements. A screen 122 is mounted on the weir and a downwardly extending drainpipe 124, having a sock-type valve 126 at the lower end thereof, is provided to open and close in response to the height of liquid in the drainpipe. As liquid is continuously drained from the top layer of the filter bed 14, it collects in the drainpipe, and when the height or head of liquid reaches a desired level, the valve 126 opens up, discharging the contents downwardly onto the lower filter bed 12.

It will be seen from the foregoing that the filter beds 14 and 12, constructed in accordance with the present invention, are simple in construction, low in cost, and extremely efficient in operation. Close dimensional tolerances are not required for the individual filter elements and they can be easily removed and replaced for cleaning. The continuous movement of the individual filter elements serves to dislodge large accumulations of material from the surfaces thereof and the fixed scrapers 114 also aid in dislodging large accumulations of contaminants.

Referring now, more specifically, to FIGS. 6 and 7, therein is illustrated another embodiment of a filter bed 12 constructed in accordance with the present invention and employing a modified type of filter element 100. These elements comprise hollow tubes, sleeves or pipes, rather than solid rods or bars, as in the previous embodiment, and each element is threaded internally adjacent its ends in order to receive a removable end plug member 130 having external threads thereon. The plug members 130 are formed with concentric, outwardly projecting axles or bosses 102 for supporting the filter elements in the manner previously described. The filter elements may be formed of galvanized or black iron pipe or other tubular stock of various materials, and when the surfaces of the elements become worn or pitted they may be easily replaced by simply unscrewing the end plug members 130 and threadedly inserting the plugs into the replacement elements.

Another aspect of the filter bed shown in FIGS. 6 and 7 is that the nozzles 110 for spraying liquid into the system are positioned at a level even with the filter elements, rather than below, to direct the liquid spray horizontally into the spaces between adjacent elements. Accordingly, the finely divided liquid droplets from the nozzles 110 are mixed into the gas flow in the region of highest velocity between the adjacent filter elements and excellent mixing of the liquid droplets with the gas particles is obtained as well as better film formation on the surfaces of the elements.

Referring now to FIG. 8, there is illustrated a modified form of filter bed 12 in accordance with the present invention employing filter elements 100 having removable sleeves 132 thereon which are replaceable and may be fabricated of material different from the body of the element. The sleeves may be constructed of ceramic material or other types of corrosion or abrasive-resistant material desired for the gases being processed in the dust collector. After the sleeves wear down to a minimum desired thickness, they are readily replaced by simply removing them endwise from the main body of the filter elements and slipping on a new sleeve 132 in their stead.

Another modification shown in FIG. 8 is the use of slots 104 in the bearing bars 106 having a top surface which is an inverted V-shape, rather than a curved or arcuate configuration, as in the prior embodiments. Because of the sloping and intersecting planes of the slot 104, the filter elements 100 are more rapidly directed towards the vertical center of the slot when it is laterally displaced therefrom, and hence lateral displacement of the elements is somewhat more limited. It is to be understood that the slots 104 in the support bars 106 of prior embodiments may be modified to have V-shaped upper surfaces as shown in FIG. 8, rather than the gently curved, arcuate surfaces described, and that the action of both types of upper end surfaces of the slots is generally similar, the V-shaped configuration of FIG. 8 having the characteristic of more rapidly returning the laterally displaced filter elements to a centered position than the gently curved upper end surfaces of the previous embodiments.

Referring now to FIGS. 9 through 12 of the drawings, therein is illustrated yet another embodiment of the present invention wherein the filter bed 12 includes a plurality of filter elements 100 which are fabricated from standard pipe or tubing cut to appropriate lengths. The throat section 44 is fabricated with a first pair of angles 146a parallel to the filter elements 100 and having unequal flanges, the larger flanges being disposed vertically to form opposite sides of the throat section. These larger flanges are joined with downwardly extended, vertical flanges 48b formed along the lower edge of the upwardly and outwardly sloping throat section walls 48 and the smaller, horizontal flanges of the angles 146a are joined to horizontal flanges 42b along the upper edges of the inwardly and upwardly sloping lower throat section walls 42. Transverse sides of the throat portion 44 are provided by a second pair of angles 146b extended normal to the filter elements at opposite ends thereof, and the filter elements are supported on the upper edges of the vertical flanges of the angles 146b, as shown in FIG. 10, for sliding and rolling movement thereon when the gas is moving through the filter bed. A pair of outer, vertical side plates 146c are welded or otherwise secured onto the outside surfaces of the upstanding flanges of the angles 146b to enclose the upper portion of the throat section, and the filter elements 100 are dimensioned so that the opposite ends thereof are spaced slightly from the inside surfaces of the side plates 146c, thereby permitting free movement of the filter elements without end interference.

In order to limit the upward and horizontal movement of the filter elements 100 and to aid in returning the elements to their centered or neutral position, a pair of upper guide bars 204 are removably secured to the inside surfaces of the side plates by bolts 108 which extend through vertical slots provided in the guide bars. The lower edges of the guide bars are formed with a series of V-shaped notches or guiding surfaces, one notch adjacent each filter element, and as the filter elements are lifted by the gas flow the surfaces of the notches tend to guide and restore the elements to the neutral or centered position. The guide bars 204 are adjustable vertically on the side plates 146c to limit the amount of vertical upward travel of the filter elements, as best shown in FIG. 12, and the surfaces of the notches function in the same manner as the upper surfaces of the slots 104 in the embodiments of FIGS. 5 and 8 to guide the respective filter elements into their neutral or centered positions aligned on vertical planes extended through the apexes of the notches.

Fixed scraper bars 114 attached to the guide bars 204 by angle brackets 116 and bolts 118 are provided to facilitate removal of large deposits on the surfaces of the filter elements 100 as the elements roll and vibrate as in the other embodiments. Generally, the lowest points on the lower edge of the guide bars 204 between adjacent notches therein are positioned at a height above the angles 146b so that the individual filter elements may not move too far off center from their neutral position and thus one filter element cannot move over horizontally to occupy the position underneath the next adjacent notch in the guide bars. Accordingly, the filter elements are limited in the amount of horizontal travel permitted and cannot bunch up on one side or the other of the throat section 44. The bars 204 are readily removable to facilitate removal and cleaning or replacement of the individual filter elements 100. The elements are merely cut lengths of commonly available tube or pipe and accordingly are inexpensive and simple to install in place. Moreover, no axle bosses, threaded end plugs, or other mounting paraphernalia is required and the resultant cost of the filter bed is thereby reduced.

From the foregoing description, it should be understood that the present invention provides a new and unique filter bed for dust collectors and the like, wherein the sizing or dimensional tolerances of the individual filter elements is not critical. Moreover, the filter elements are independently moveable by the gas flow in both lateral and vertical directions, and the elements also are rotatable about their respective longitudinal axes. The filter beds are substantially self-cleaning, and fresh surface areas on the elements wetted with liquid film are continuously provided for direct contact with the incoming gas. The filter bed of the present invention is simple of construction and low in cost and maintenance. Moreover, the constant vibration and movement of the filter elements during gas flow provides for better atomization and mixing of the droplets of liquid collection medium with the dust particles in the high velocity gases flowing through the filter bed, so that higher collection efficiencies are obtained even with smaller size dust particles down to a few microns.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. In a dust collector for separating contaminants from gases, a filter bed comprising a plurality of elongated filter elements disposed in spaced apart, side-by-side substantially parallel relation transversely across the flow path of gases in said collector, each of said filter elements including a substantial exterior surface area for contacting the gas flowing between adjacent filter elements, and support means loosely supporting said filter elements in said flow path and permitting limited movement of said elements toward and away from adjacent elements in response to gas flow therebetween.

2. The apparatus of claim 1 wherein said support means includes structure permitting limited movement of said filter elements parallel with the general direction of gas flow through said filter bed.

3. The apparatus of claim 1 including scraper means having an edge disposed adjacent the exterior surface of at least one filter element for removing material collecting on said element from said gas.

4. The apparatus of claim 1 wherein said support means includes bearing means permitting rotation of said elements about their respective longitudinal axes as said gas flows therebetween.

5. The apparatus of claim 4 wherein said support means includes structure permitting limited movement of said filter elements parallel with the general direction of gas flow through said filter bed.

6. The apparatus of claim 4 including fixed scraper means having an edge disposed longitudinally with respect to and closely adjacent the exterior surface of at least one filter element for removing material collecting on said element from said gas upon rotation of said element about its longitudinal axis.

7. In a dust collector for separating contaminants from gases, a filter bed comprising a plurality of elongated filter elements, each having a substantial exterior surface for contacting the gas flowing through the bed, said filter elements disposed in spaced apart, side-by-side substantially parallel relation defining a constricted flow path for gas between the exterior surfaces of adjacent elements, and means loosely supporting said filter elements for limited movement toward and away from one another in response to gas flow to increase and decrease the size of the constricted flow path therebetween.

8. The apparatus of claim 7 wherein said filter bed includes at least two pairs of filter elements, the elements of one pair disposed transversely of the elements of the other pair and generally normal to the direction of gas flow through said filter bed.

9. The apparatus of claim 7 including means for introducing liquid collecting medium in said filter bed between adjacent filter elements.

10. The apparatus of claim 7 wherein said filter elements comprise elongated cylinders supported at opposite ends for rotation about their respective longitudinal axes.

11. The apparatus of claim 7 wherein said last mentioned support means supports said filter elements for independent rotation about their longitudinal axes in response to the frictional forces of the flowing gases acting on the exterior surfaces thereof.

12. The apparatus of claim 11 including scraper blades extending longitudinally of said filter elements, each of said scraper blades having one edge engageable against the exterior surface of an adjacent filter element for dislodging the material collected thereon from said gases as said filter element rotates.

13. The apparatus of claim 11 wherein said last mentioned support means comprises a support member at opposite ends of said filter elements and axle means longitudinally of said filter elements engaging said support members.

14. The apparatus of claim 13 wherein said axle means extends outwardly of opposite ends of each filter element and projects into a slot formed in a support member, said slots being spaced along said support member to limit the maximum and minimum spacing between adjacent filter elements.

15. The apparatus of claim 14 wherein said slots are wider and longer than the diameter of said axle means and include concave surfaces at one end for guiding said axle means toward a centered position with respect to the width of the slots.

16. The apparatus of claim 15 wherein said concave end surfaces of said slots are V-shaped.

References Cited

UNITED STATES PATENTS

| | | | |
|---|---|---|---|
| 2,253,261 | 8/1941 | Bacon | 261—94 |
| 2,907,404 | 10/1959 | Mare | 261—112 X |
| 3,032,868 | 5/1962 | Billner | 55—490 X |
| 3,141,910 | 7/1964 | Pearce | 55—444 X |
| 3,181,287 | 5/1965 | Rabson | 261—108 X |
| 3,332,214 | 7/1967 | Huppke. | |
| 3,348,825 | 10/1967 | McIlvaine | 261—98 |

FOREIGN PATENTS

| | | |
|---|---|---|
| 116,167 | 12/1900 | Germany. |

TIM R. MILES, Primary Examiner

U.S. Cl. X.R.

55—231, 241, 290, 405; 261—90, 112